UNITED STATES PATENT OFFICE.

HORACE WILLIAMS AND JOHN L. ALBERGER, OF BUFFALO, NEW YORK.

MANUFACTURING GLUCOSE OR GRAPE-SUGAR.

SPECIFICATION forming part of Letters Patent No. 248,972, dated November 1, 1881.

Application filed July 29, 1881. (Specimens.)

*To all whom it may concern:*

Be it known that we, HORACE WILLIAMS and JOHN L. ALBERGER, of Buffalo, in the county of Erie and State of New York, have jointly invented a certain new and improved method of treating grain or other amylaceous substances for the production of grape-sugar or glucose, of which the following is a description in such full, clear, concise, and exact terms as to enable any one skilled in the arts to which it appertains or with which it is most nearly connected to use or practice the same.

The object of our invention is to simplify and cheapen the production of grape-sugar or glucose from cereals, to avoid the use of alkalies in the treatment of the grain and to obtain a purer article of grape-sugar.

The various apparatus used in our method of treating the grain and producing the sugar are old and well known in the art. No description of them is therefore necessary to a perfect understanding of our method.

The production of grape-sugar or glucose from cereals or other amylaceous substances consists, substantially, of two principal parts— viz: first, of the production of the converted starch or soluble dextrine; second, of the saccharification of the soluble dextrine to produce the sugar.

Our invention consists of a novel method of treating the grain to produce the converted starch or soluble dextrine, the saccharification being the same as heretofore practiced.

In describing our method of treating the grain for the production of the converted starch we assume the method now in use to be understood.

Our method is as follows: First, we soak the grain in water raised to a temperature of about 160° of Fahrenheit for a period of from twenty-four to thirty-six hours, depending upon the condition of the grain as to dryness and the temperature of the weather, less soaking being required when the grain is moist and the weather warm; second, we take the grain thus soaked in warm water and grind it in millstones, or otherwise mash and reduce it in any suitable mill, in the presence of a stream of water running through the mill on the grain during the operation of grinding; third, we take this wet ground grain and pass it in the presence of a stream of water from the grinding apparatus to a bolting apparatus of any suitable construction to separate the husks of the grain from the gluten, albumen, starch, &c., the water being used to carry the pulpy parts of the grain through the bolting-cloth and to wash the meal off the husk and the husks off of the separator; fourth, we receive all that part of the grain and water that passes through the bolting-cloth into the suitable tubs, and let it stand at rest until it settles, and then draw off the supernatant liquor after the starch and bolted material mixed with it is well settled, which will take from seven to nine hours; fifth, we add water to the starch and material in the tubs and agitate it until it reaches a gravity of from 9° to 15° Baumé; sixth, we run this mixture of water, starch, albumen, gluten, &c., into a suitable vessel and boil it with steam until the starchy portions are converted into a mixture of soluble starch and dextrine intermingled with the other portions of grain in the mixture. This may be done either by open steam or high-pressure steam in a closed vessel; or we boil the mixture from the tubs by steam-heat either in an open or closed vessel, into which has been placed from one to three ounces of sulphuric acid of 1.66 gravity for every forty pounds of starch the mixture contains. When forty to sixty pounds steam is used the conversion will take place in about two hours, and we prefer high steam, as it makes the process more rapid and costs less for steam. We have now got in the converting-vessel a solution of converted starch and soluble dextrine, in which is contained the gluten and albumen of the grain coagulated by the heat of the steam, and also the other constituents of the grain resulting from the process. Our next and seventh step is to pass the mixture from the converting-vessel through a filter-press, by which all the gluten, albumen, and other refuse is separated from the soluble starch and dextrine, which passes freely through the filter, while the gluten, albumen, and other parts are retained in the filter, thus leaving the soluble starch and dextrine free from impurities and in a proper condition for final conversion or saccharification. This is done either in an open or closed vessel by the action of steam-heat and acid, as the wants of the manufacturer may require. From the amount of acid usually used for this purpose—say from one to three per cent. of the weight of the starch in the grain—that which has been used in the previous conversion may be deducted. The saccharine solution thus obtained may be treated in any of the usual well-known ways.

Instead of passing the converted starch and dextrine through a filter-press for separating the refuse-matters a centrifugal may be used, or any other suitable filtering apparatus; but we prefer a filtering-press as best adapted for the purpose.

Instead of sulphuric acid used in the treatment of mixture for conversion any other suitable acid or acid-gas may be used; but care should be taken when acid is used not to use sufficient to act upon the oil or other bitter and offensive elements of the grain.

It will be seen that our invention begins with the treatment of the grain and ends with the production of a filtered solution of converted starch or soluble dextrine, which may be converted into grape-sugar or glucose or used in the manufacture of ale, beer, wine, spirits, or vinegar.

In the manufacture of vinous, spirituous, or acetous liquors from the soluble starch and dextrine, in case acid has been used in the first instance in the conversion, then it will be necessary to neutralize and settle out the neutralizing medium or filter it out before the application of malt to the solution of soluble starch and dextrine in the mash-tub for the purpose of saccharification. This method produces a larger yield of grape-sugar or glucose or spirituous or vinous liquors, because in the ordinary washing processes of separation of starchy substances much of the starch is lost by the successive decantations, and in the case of vinous or spirituous liquors a large portion of the starchy matter fails to be acted on by the saccharifying material. By first converting the starchy matters into soluble starch and dextrine this difficulty is avoided. This method also obviates the objections incidental to the use of alkali in the treatment of the grain or starchy portions, evading the alkaline compounds of oil, gluten, and albumen, which are difficult to eliminate, if not practically impossible, avoiding the necessity of using a large assemblage of tubs supplied with expensive agitating apparatus, and the usual expensive tables for separating the gluten, albumen, and oil. In short, we economize in time, space, and apparatus, while at the same time we produce a purer manufactured article of glucose or grape-sugar, or of ale, wine, beer, or spirits.

In concluding our description of this invention we observe that its principal object is to avoid the color imparted to the sirup by the method described in our patent dated August 23, 1881. By the method described in the specification of that patent the corn is ground dry, and only about six pounds of bran to the bushel is bolted out of the meal, the whole of the remaining product of the mill being then put directly into the cooker, where it is subjected to high steam heat and pressure to convert the starch into dextrine and coagulate the gluten. The result of this method is a yellow or amber color in the sirup, due to an excess of bran or husk in the meal. Now, to avoid this we adopt the old method in the first steps of our present method—that is, we begin by soaking the corn and grinding it wet and by separating about twelve pounds of husks and glutinous matter to the bushel from the wet meal by means of the well-known sieving or bolting separators in combination with water. At this point we depart from the old method and adopt our previous method in this: We take the crude starch as it comes from the separator and put it directly into the cooker, after allowing the starch to settle and drawing off the supernatant liquor. The starch is then subjected to high steam heat and pressure until its conversion into a mixture of starch and dextrine capable of being filtered. The mixture is then put through a filter, by which the remaining portions of husky or fibrous matters and the gluten and albumen are separated from the converted starch. The converted starch is then put into the saccharifier and converted into sugar.

It will thus be seen that we depart from our own previous method in making a crude starch separated from the husky and fibrous matters before cooking, and that we depart from all other methods in cooking this crude starch after its separation from the husky and fibrous matters, first, into a steam-tight vessel, by which the starch is converted into dextrine, and by then filtering out the gluten and albumen and remaining fibrous matter before saccharifying, thus avoiding the old method of alkaline or acid washing, decanting, and the lengthened manipulation of cleansing the starch.

What we claim, therefore, as our improvement in the method of treating grain for the production of sugar or sirup is—

Grinding the corn wet, then washing and separating the starch from the husk, then taking it directly from the separator to the cooker, converting it into dextrine, and filtering it before saccharification.

HORACE WILLIAMS.
JOHN L. ALBERGER.

Witnesses:
PHILIP KIMPEL,
F. S. MILLER, Jr.